(12) United States Patent
Yetukuri et al.

(10) Patent No.: US 11,124,090 B2
(45) Date of Patent: Sep. 21, 2021

(54) SEAT ASSEMBLY

(71) Applicant: Lear Corporation, Southfield, MI (US)

(72) Inventors: Arjun Yetukuri, Rochester Hills, MI (US); Mark Weaver, Auburn Hills, MI (US); Karl Henn, New Hudson, MI (US); Mladen Humer, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 209 days.

(21) Appl. No.: 16/208,614

(22) Filed: Dec. 4, 2018

(65) Prior Publication Data

US 2020/0171979 A1 Jun. 4, 2020

(51) Int. Cl.
*B60N 2/02* (2006.01)
*B60N 2/00* (2006.01)

(52) U.S. Cl.
CPC .......... *B60N 2/0244* (2013.01); *B60N 2/002* (2013.01); *B60N 2002/0268* (2013.01); *B60N 2002/0272* (2013.01)

(58) Field of Classification Search
CPC ................. B60N 2/0244; B60N 2/002; B60N 2002/0268
See application file for complete search history.

(56) References Cited

U.S. PATENT DOCUMENTS

| | | | |
|---|---|---|---|
| 9,333,880 B2 | 5/2016 | Farquhar | |
| 9,383,872 B2 | 7/2016 | Yetukuri et al. | |
| 9,451,020 B2 | 9/2016 | Liu et al. | |
| 10,147,325 B1 | 12/2018 | Copeland et al. | |
| 2014/0306500 A1* | 10/2014 | Dryburgh | B64D 11/06 297/232 |
| 2015/0317568 A1 | 11/2015 | Grasso et al. | |
| 2016/0264021 A1 | 9/2016 | Gillett | |
| 2016/0379631 A1* | 12/2016 | Wang | G06F 3/167 704/275 |
| 2018/0029716 A1* | 2/2018 | Sieben | B64D 11/0643 |
| 2018/0039917 A1 | 2/2018 | Buttolo et al. | |
| 2018/0072188 A1* | 3/2018 | Yamada | B60N 2/0244 |
| 2018/0154799 A1* | 6/2018 | Lota | B60K 35/00 |
| 2018/0244175 A1* | 8/2018 | Tan | B60N 2/22 |
| 2018/0275648 A1 | 9/2018 | Ramalingam | |
| 2020/0047641 A1* | 2/2020 | D'Eramo | A47C 3/04 |

FOREIGN PATENT DOCUMENTS

| | | |
|---|---|---|
| DE | 102017202222 A1 | 10/2017 |
| DE | 102017114231 A1 | 1/2018 |
| JP | 2008158578 A | 7/2008 |

* cited by examiner

*Primary Examiner* — Jess Whittington
(74) *Attorney, Agent, or Firm* — Fishman Stewart PLLC (57) ABSTRACT

A seat assembly includes a seat, one or more sensor assemblies, and/or an electronic control unit that may be connected to the one or more sensor assemblies. The one or more sensor assemblies may provide information about a first position of the seat to the electronic control unit. The electronic control unit may be configured to receive a second position of the seat, and/or the electronic control unit may be configured to automatically move the seat to the second position without contacting other objects. The electronic control unit may include a second seat, and/or the electronic control unit may be configured to automatically move the second seat from a first second seat position to a second second seat position. The electronic control unit may be configured to determine a movement path of the seat according to information from the one or more sensor assemblies.

13 Claims, 9 Drawing Sheets

SEAT ASSEMBLY

TECHNICAL FIELD

The present disclosure generally relates to a seat assembly, including seat assemblies that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat assemblies may be relatively complex and/or may not provide sufficient functionality. Some seat assemblies may not be configured to automatically move seats within a vehicle.

There is a desire for solutions/options that minimize or eliminate one or more challenges or shortcomings of seat assemblies. The foregoing discussion is intended only to illustrate examples of the present field and should not be taken as a disavowal of scope.

SUMMARY

In embodiments, a seat assembly may comprise a seat, one or more sensor assemblies, and/or an electronic control unit that may be connected to the one or more sensor assemblies. The one or more sensor assemblies may provide information about a first position of the seat to the electronic control unit. The electronic control unit may be configured to receive a second position of the seat, and/or the electronic control unit may be configured to automatically move the seat to the second position, such as without contacting other objects. The electronic control unit may include a second seat, and/or the electronic control unit may be configured to automatically move the second seat from a first second seat position to a second second seat position. The electronic control unit may be configured to determine a movement path of the seat according to information from the one or more sensor assemblies. The movement path may not intersect with the second position of the second seat. Automatically moving the second seat from the first position to the second position may include rotating the second seat such that the second seat may not intersect with the movement path. The electronic control unit may be configured to analyze information from the one or more sensor assemblies to determine the first position of the second seat.

With embodiments, the one or more sensor assemblies may include a first proximity sensor of the seat and/or a second proximity sensor of the second seat. The seat assembly may include another seat, such as a second seat and/or a third seat; wherein automatically moving the seat to the second position includes moving at least one of the second seat and/or the third seat. The seat assembly may include a console, and/or the electronic control unit may be configured to move the console to facilitate movement of the seat from the first position to the second position. The electronic control unit may be configured to automatically move the seat longitudinally, rotationally, vertically, and/or angularly.

In embodiments, the seat assembly may include a plurality of seats, and/or the plurality of seats may include the seat. The one or more sensor assemblies may include one or more occupancy sensors. The electronic control unit may be configured to determine whether the plurality of seats are occupied via the one or more occupancy sensors. The electronic control unit may be configured to determine movement paths of the plurality of seats according to user input. When determining the movement paths, the electronic control unit may be configured to prioritize movement of unoccupied seats over movement of occupied seats. The one or more sensor assemblies may include a camera, a proximity sensor, and/or an occupancy sensor. The one or more sensor assemblies may include a sensor disposed at a front of a vehicle.

With embodiments, a method of moving a seat assembly may include providing one or more sensor assemblies, and/or providing a plurality of seats that may include a first seat. The method may include providing an electronic control unit that may be configured to control movement of the plurality of seats. The method may include receiving user input of a second position of the first seat. The method may include determining a first position of the first seat, and/or determining a proposed movement path of the first seat directly from the first position to the second position. The method may include determining a final movement path of the first seat from the first position to the second position that may not contact other seats of the plurality of seats. The method may include moving the first seat to the second position.

In embodiments, the method may include moving a second seat of the plurality of seats from a first second seat position that may intersect with the proposed movement path to a second second seat position that may not intersect the proposed movement path, and/or the proposed movement path and the final movement path may be the same. The method may include moving a second seat of the plurality of seats from a first second seat position that may intersect with the proposed movement path to a second second seat position that may not intersect the proposed movement path, and/or the proposed movement path and the final movement path may not be the same. Moving the first seat may include at least one and/or two of longitudinal movement, rotational movement, vertical movement, and/or angular movement of the first seat. The method may include providing a second seat and/or a third seat, and/or determining whether the second seat is occupied. Determining the final movement path may include prioritizing movement of the third seat over the second seat.

With embodiments, the method may include providing an object, and/or moving the object such that the object may not intersect with the final movement path. The first position of the first seat may include a body of an occupant of the first seat.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1A:
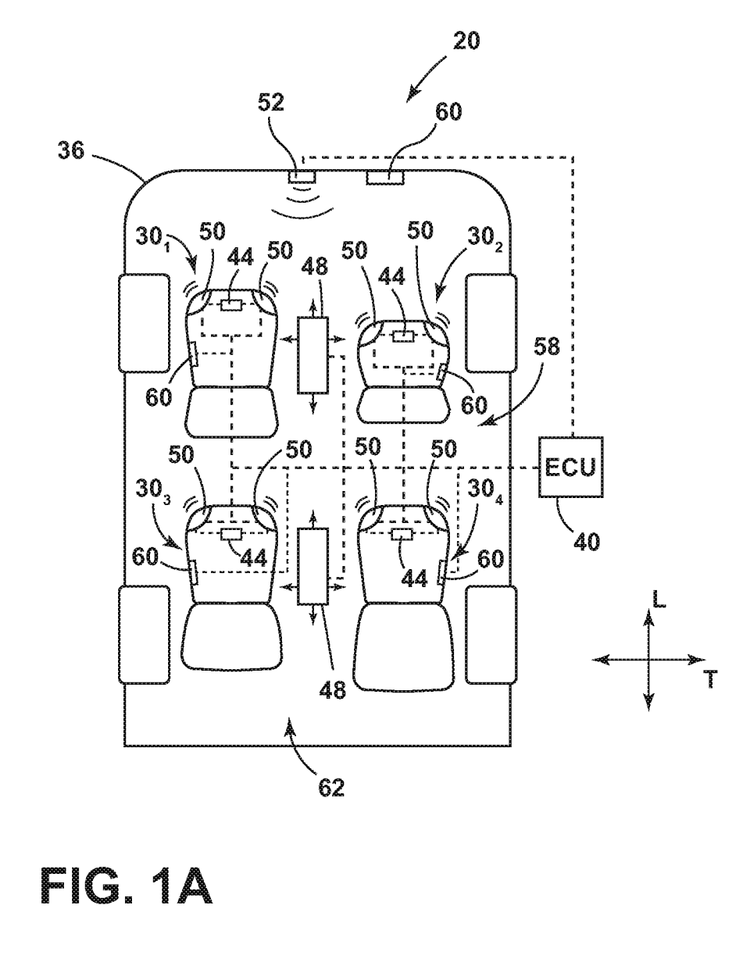
FIG. 1A is a top view generally illustrating an embodiment of a seat assembly according to teachings of the present disclosure.

In embodiments, such as generally illustrated in FIG. 1A, a seat assembly 20 may include one or more seats 30, such as a first seat $30_1$, a second seat $30_2$, a third seat $30_3$, and/or a fourth seat $30_4$. The seats 30 may each include a seat base 32 and/or a seat back 34 (see, e.g., FIGS. 1C-1F). The first seat $30_1$, the second seat $30_2$, the third seat $30_3$, and/or the fourth seat $30_4$ may be disposed within a vehicle 36 and/or connected to a mounting surface 38 (e.g., a vehicle floor, such as shown in FIGS. 1C-1F). In embodiments, one or more seats 30 may be configured to move (e.g., longitudinally, laterally/transversely, vertically, rotationally, angularly, etc.). The seats 30 may be disposed in proximity to each other and/or other objects such that a seat 30, as it moves, could contact another seat 30 and/or an object 48 (e.g., cargo items, consoles, vehicle structures, etc.). Avoiding contact between seats 30 and/or other objects 48 may be desirable. Additionally or alternatively, other seats 30 and/or one or more objects 48 may be disposed, at least initially, such that the other seats 30 and/or one or more objects 48 may impede or prevent movement of a particular seat 30.

With embodiments, seats 30 may be moved in response to input from a user. For example and without limitation, a vehicle 36 may be an autonomous vehicle that a driver may not be required to steer, and the driver may desire to move a seat 30 to a different position, such as to face one or more other seats 30 (e.g., the driver may not actively drive the vehicle 36).

Figure 2A:
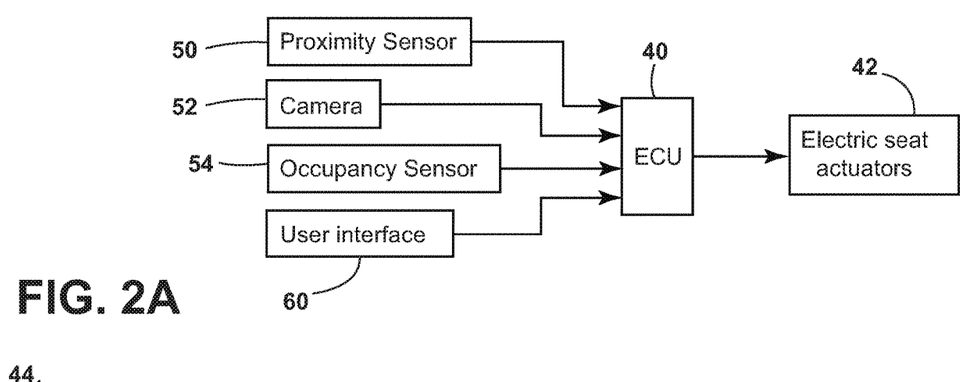
FIG. 2A is a schematic generally illustrating connections of an embodiment of an electronic control unit of a seat assembly according to teachings of the present disclosure.
Figure 2B:
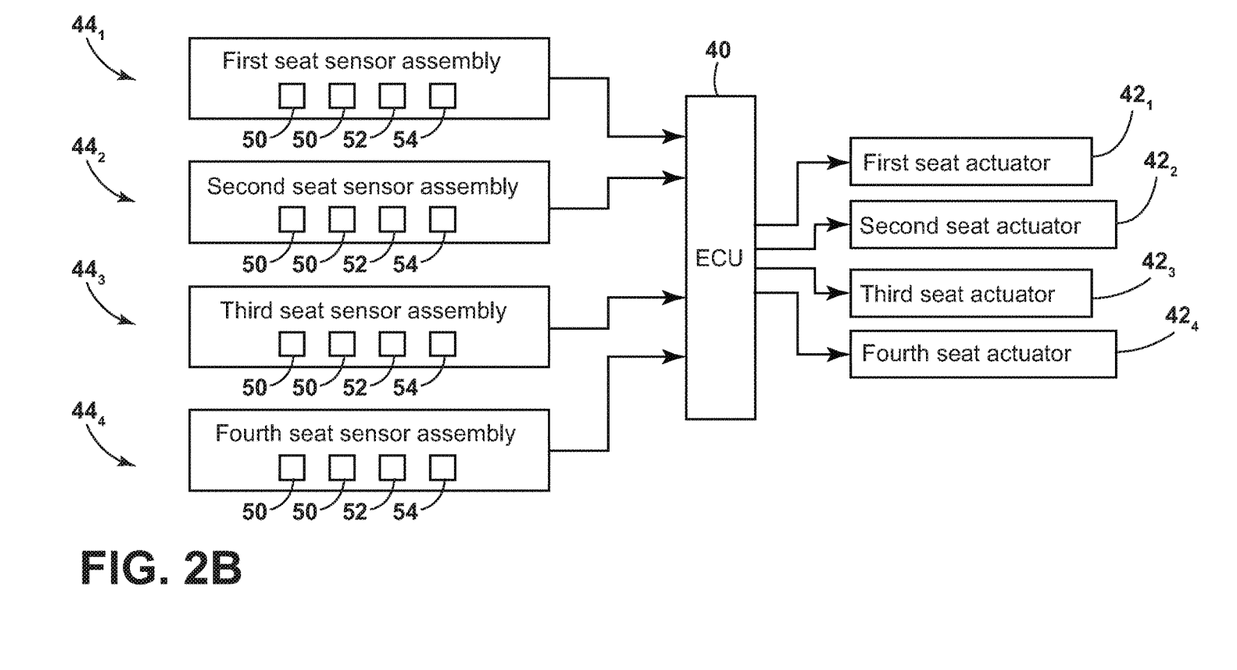
FIG. 2B is a schematic generally illustrating connections of an embodiment of an electronic control unit of a seat assembly according to teachings of the present disclosure.

In embodiments, the seat assembly 20 may include an electronic control unit (ECU) 40 that may be configured to control movement of the seats 30, such as the first seat $30_1$, the second seat $30_2$, the third seat $30_3$, and/or the fourth seat $30_4$. The ECU 40 may be connected to and/or incorporated with a vehicle electronics system. As generally illustrated in FIGS. 2A and 2B, the ECU 40 may be connected to seat actuators 42 (e.g., electric motors) of each of the first seat $30_1$, the second seat $30_2$, the third seat $30_3$, and/or the fourth seat $30_4$. The ECU 40 may be configured to automatically move the first seat $30_1$, the second seat $30_2$, the third seat $30_3$, and/or the fourth seat $30_4$ via the actuators 42 (e.g., actuators $42_1$, $42_2$, $42_3$, $42_4$), such as according to input from a user. The ECU 40 may be configured to automatically move the first seat $30_1$ without any input from the user. For example and without limitation, the ECU 40 may move the first seat $30_1$ to a more comfortable position when the user (e.g., the driver) is no longer in control of the vehicle 36. Additionally or alternatively, the ECU 40 may be configured to move the seats 30 automatically without direct user input. For example and without limitation, the ECU 40 may be configured to move one or more seats 30 (e.g., to a more comfortable position and/or to face other occupied seats 30) as soon as a driver is no longer actively driving the vehicle 36.

In embodiments, such as generally shown in FIGS. 1A, 1B, 1C, 1D, 1E and 1F, movement of the seats 30 may include one or more of a variety of different types of movements. A first type of movement may include tilting/angling the seat base 32 and/or tilting/angling the seat back 34. The ECU 40 may move/tilt the seat back 34 between a substantially horizontal position (see, e.g., FIG. 1D) and a substantially vertical position (see, e.g., FIGS. 1E and 1F). Additionally or alternatively, the ECU 40 may be configured move the seat base 32 between a substantially horizontal position (see, e.g., FIGS. 1C and 1D) and a substantially vertical position (see, e.g., FIG. 1F). The first seat $30_1$, the second seat $30_2$, the third seat $30_3$, and/or the fourth seat $30_4$ may include a position in which the seat back 34 and the seat base 32 may both be substantially vertical (see, e.g., FIG. 1F). The first seat $30_1$, the second seat $30_2$, the third seat $30_3$, and/or the fourth seat $30_4$ may include a position in which the seat back 34 and the seat base 32 may both be substantially horizontal. Additionally or alternatively the first seat $30_1$, the second seat $30_2$, the third seat $30_3$, and/or the fourth seat $30_4$ may include positions between a substantially horizontal position and a substantially vertical position, such as generally illustrated in FIG. 1A in connection with the second seat $30_2$ and the third seat $30_3$.

Figure 1B:
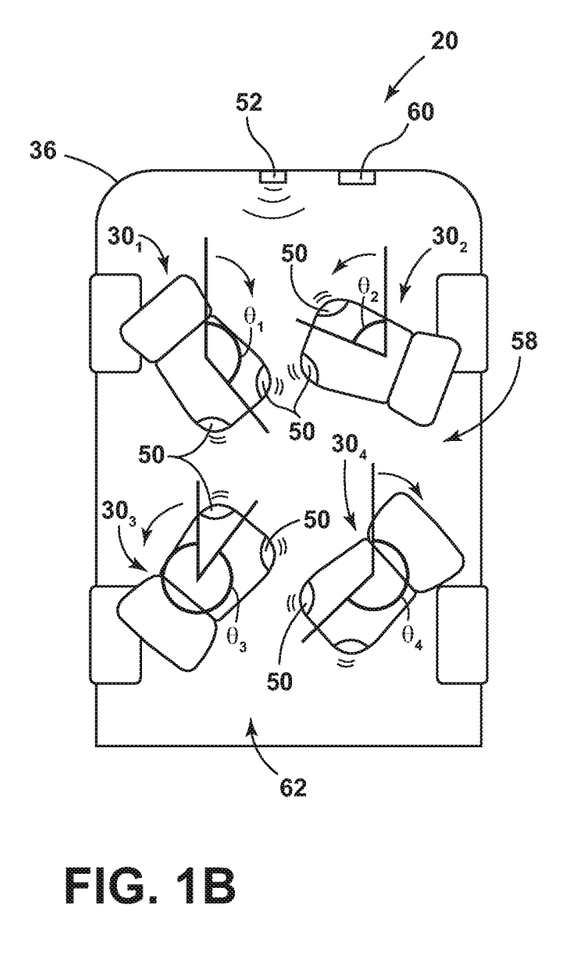
FIG. 1B is a top view generally illustrating portions of embodiments of a seat assembly in various positions according to teachings of the present disclosure.
Figure 1C:
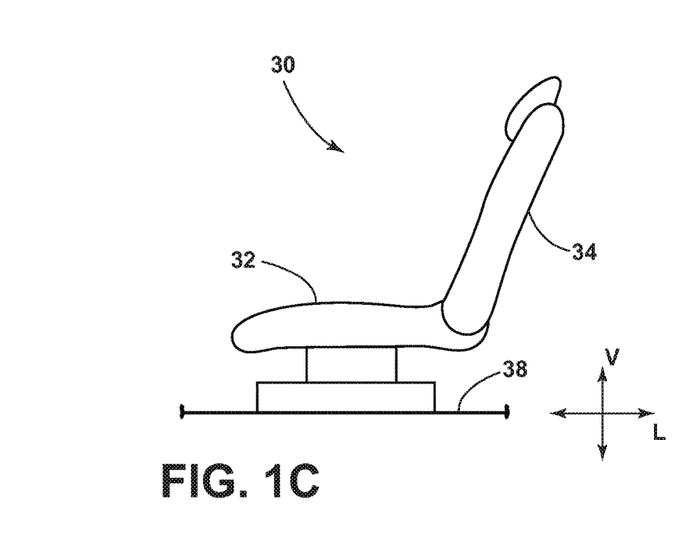
FIGS. 1C, 1D, 1E, and 1F are side views generally illustrating portions of embodiments of seat assemblies in various positions according to teachings of the present disclosure.
Figure 1D:
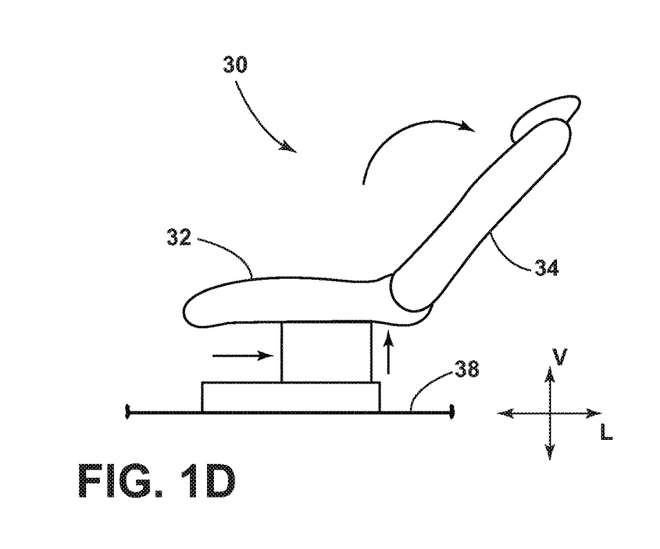
Figure 1E:
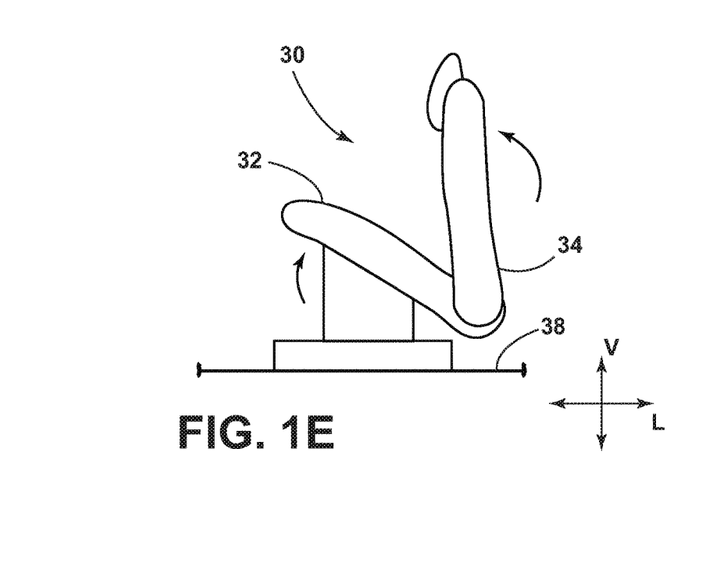
Figure 1F:
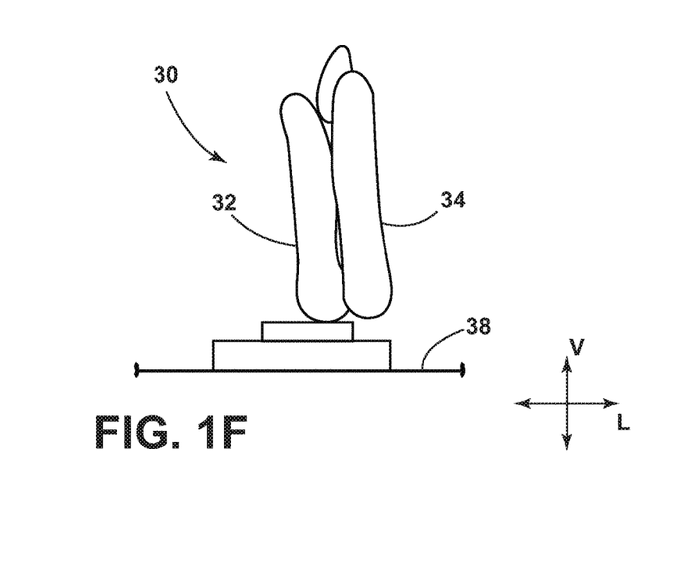

In embodiments, such as generally shown in FIGS. 1C, 1D, and 1E, the ECU 40 may be configured to control movement of the seat bases 32 of the first seat $30_1$, the second seat $30_2$, the third seat $30_3$, and/or the fourth seat $30_4$ in a vertical direction V. For example and without limitation, the ECU 40 may cause a seat 30 may move between a lower vertical position (see, e.g., FIG. 1C) and a higher vertical position (see, e.g., FIG. 1D). In embodiments, the ECU 40 may be configured to control movement of the seat 30 in a longitudinal direction L (see, e.g., FIG. 1D) and/or a lateral/transverse direction T that may be substantially perpendicular to the longitudinal direction and/or the vertical direction V.

With embodiments, such as generally illustrated in FIG. 1B, the ECU 40 may be configured to control rotational movement of the seats 30. The ECU 40 may be configured to rotate the first seat $30_1$, the second seat $30_2$, the third seat $30_3$, and/or the fourth seat $30_4$ to a plurality of angular positions (e.g., relative to an initial/forward direction), such as about 90 degrees, 180 degrees, 360 degrees, and/or positions between or beyond such positions. The ECU 40 may be configured to rotate the first seat $30_1$, the second seat $30_2$, the third seat $30_3$, and/or the fourth seat $30_4$ in a clockwise direction and/or counter-clockwise direction. For example and without limitation, the first seat $30_1$ may be rotated clockwise (e.g., $\theta_1$ may be about 150 degrees), the second seat $30_2$ may be rotated counter-clockwise (e.g., $\theta_2$ may be about 75 degrees), the third seat $30_3$ may be rotated counter-clockwise (e.g., $\theta_3$ may be about 330 degrees), and/or the fourth seat $30_4$ may be rotated clockwise (e.g., $\theta_4$ may be about 225 degrees), which may include the seats 30 generally facing a center of the vehicle 36 (see, e.g., FIG. 1B). In embodiments, rotation of the seat 30 may occur simultaneously with lateral/transverse movement and/or longitudinal movement. Such movement may result in a generally elongated and/or oval-shaped motion path of the seat 30.

In embodiments, a seat assembly 20 may include one or more sensor assemblies 44, which may each include one or more sensors, such as proximity sensors 50, cameras 52, and/or occupancy sensors 54, among others. A first sensor assembly $44_1$, a second sensor assembly $44_2$, a third sensor assembly $44_3$, and/or the fourth sensor assembly $44_4$ may be connected to the first seat $30_1$, the second seat $30_2$, the third seat $30_3$, and/or the fourth seat $30_4$, respectively. Sensors of a sensor assembly 44 may, for example and without limitation, be disposed in a respective seat 30 and/or be attached to an outer surface of the respective seat 30 (e.g., the seat base 32 and/or the seat back 34). A sensor assembly 44 may include a plurality of sensors that may be disposed at different portions of the respective seats 30. Alternatively, a sensor assembly 44 may include a single sensor.

With embodiments, sensor assemblies 44 may be configured to sense (e.g., measure, obtain, gather, detect, etc.) information about one or more seats 30, one or more objects 48, and/or about a mounting location of the seats 30 (e.g., about a vehicle 36). For example and without limitation, a sensor assembly 44 may be configured to sense a distance between two (or more) seats 30, between a seat 30 and an object 48, and/or between two (or more) objects and/or an object 48. The ECU 40 may be connected to the one or more sensor assemblies 44 to determine the positions of and/or distance between seats 30 and/or objects 48 in the vehicle 36, such as via proximity sensors 50 (e.g., ultrasonic sensors, capacitive sensors, inductive sensors, etc.).

With embodiments, such as generally illustrated in FIGS. 1A, 1B, and 2A, a sensor assembly 44 may include a camera 52. The camera 52 may be used to capture image data of an interior 58 of a vehicle 36 (e.g., the first seat $30_1$, the second seat $30_2$, the third seat $30_3$, the fourth seat $30_4$, and/or objects 48). For example and without limitation, the camera 52 may be disposed at a front of the vehicle 36, on the ceiling of the vehicle 36, and/or above the first seat $30_1$, the second seat $30_2$, the third seat $30_3$, and/or the fourth seat $30_4$. The ECU 40 may be connected to the camera 52 and/or the ECU 40 may receive information from the camera 52. The information may be in the form of an image, which the ECU 40 may use to determine positions of the seats 30 and/or objects 48 in the vehicle 36. The ECU 40 may utilize image processing to create a map (e.g., a 2-D map, a 3-D map, etc.) of the interior 58 of the vehicle 36 via the information/image(s) supplied from the camera 52. In embodiments, a sensor assembly 44 may include more than one camera 52.

In embodiments, such as generally illustrated in FIG. 2A, a sensor assembly 44 may include an occupancy sensor 54. The occupancy sensor 54 may be configured to determine whether a seat 30 is occupied, such as by an occupant 56. The occupancy sensor 54 may be configured to determine whether a particular seat 30 is occupied, whether all the seats 30 are occupied, and/or whether a plurality of the seats 30 are occupied. The first seat $30_1$, the second seat $30_2$, the third seat $30_3$, and/or the fourth seat $30_4$ may include a respective occupancy sensor 54. The occupancy sensor 54 may be a force sensor (e.g., configured to sense a force exerted upon the seat base 32). Additionally or alternatively, the ECU 40 may be configured to receive information from the camera 52 to determine whether the first seat $30_1$, the second seat $30_2$, the third seat $30_3$, and/or the fourth seat $30_4$ is occupied.

With embodiments, such as generally illustrated in FIGS. 2A and 2B, the ECU 40 may be connected to one or more sensor assemblies 44. In embodiments, the seats 30 may each include one or more sensor assemblies 44 that may be connected to the ECU 40. The ECU 40 may be connected to actuators 42 (e.g., electric motors) of the first seat $30_1$, the second seat $30_2$, the third seat $30_3$, and/or the fourth seat $30_4$. The ECU 40 may control the actuators 42 to control movement (e.g., vertical, longitudinal, rotational, and/or angular/tilt) of the first seat $30_1$, the second seat $30_2$, the third seat $30_3$, and/or the fourth seat $30_4$.

In embodiments, the ECU 40 may be configured to determine the positions (e.g., current positions) of the seats 30 according to information from the one or more sensor assemblies 44. Determining the position may include determining the tilt/angular position, longitudinal position, vertical position, rotational position, and/or physical space of the seat 30. The one or more sensor assemblies 44 may detect a body of the occupant 56 (e.g., legs, arms, etc.). The ECU 40 may consider and/or compensate for the body of the occupant 56 in determining positions and/or movement of the seats 30. The bodies of the occupants 56 may be included in the positions of the seats 30 such that the ECU 40 may move the seats 30 so bodies of occupants 56 do not contact other seats 30, bodies of other occupants 56, and/or objects 48 in the vehicle 36.

In embodiments, the ECU 40 may connect to the one or more sensor assemblies 44 to detect objects 48 (e.g., cargo items, consoles, vehicle structures, etc.) in the vehicle 36 and/or the ECU 40 may include the objects 48 in the map of the vehicle interior 58.

In embodiments, an ECU 40 may include various functions and/or capabilities for sensing and/or moving seats 30 and/or objects 48 within a vehicle 36. The ECU 40 may be configured to determine the first/current positions of the first seat $30_1$, the second seat $30_2$, the third seat $30_3$, the fourth seat $30_4$, and/or one or more objects 48 via information from the one or more sensor assemblies 44 (see, e.g., FIG. 3). The one or more sensor assemblies 44 may provide relative distance information (e.g., between objects 48/seats 30) to the ECU 40. The ECU 40 may analyze the relative distance information to map locations of each seat 30 relative to an interior 58 (e.g., passenger cabin) of a vehicle 36.

Figure 3:
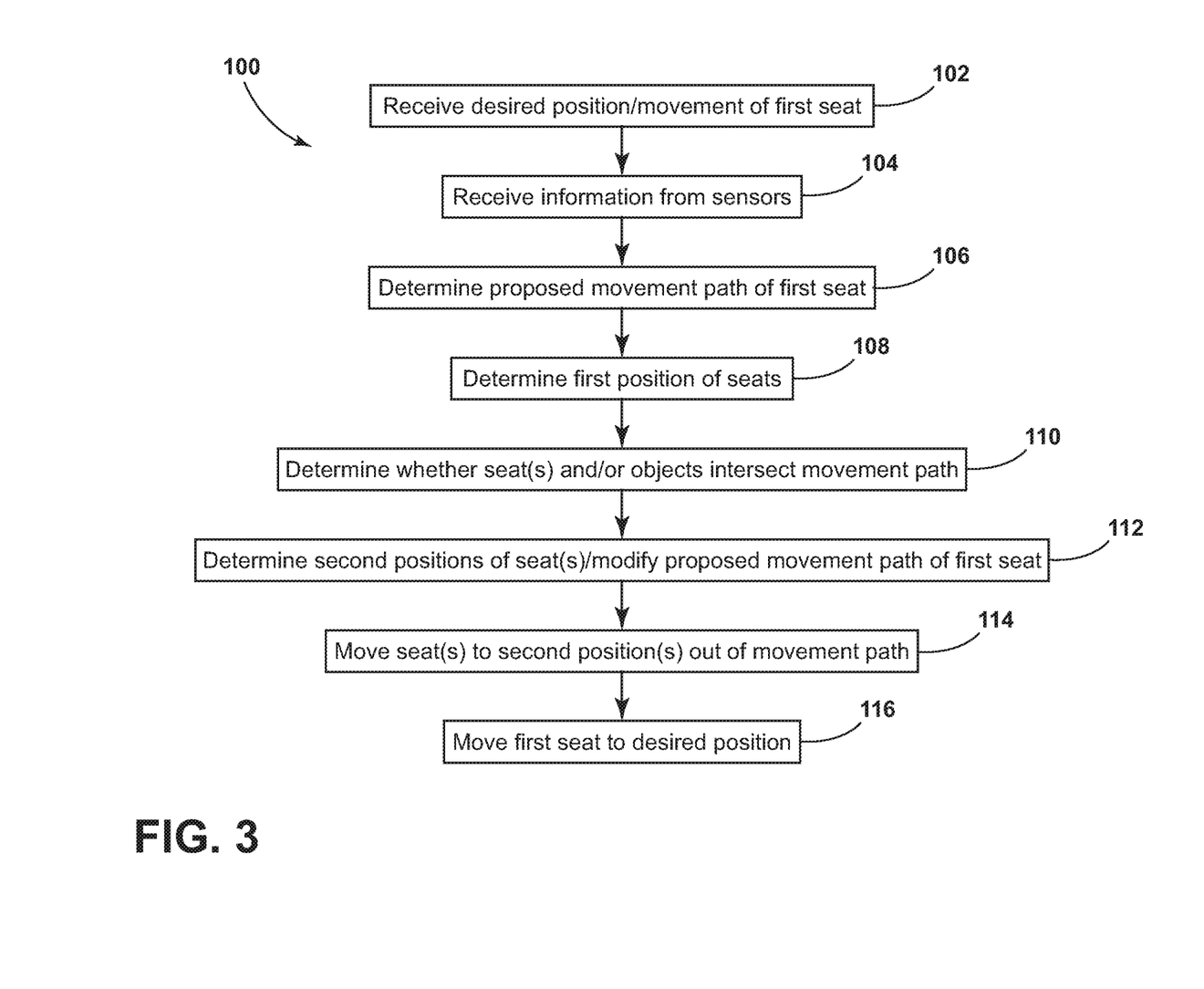
FIG. 3 is a flowchart generally illustrating an embodiment of a method of operating a seat assembly.

In embodiments, such as generally illustrated in FIG. 3, a method 100 of moving seats 30 may include the ECU 40 receiving an input from a user, such as from an occupant 56 of the first seat $30_1$, the second seat $30_2$, the third seat $30_3$, and/or the fourth seat $30_4$ (step 102). The input may include a desired position and/or a desired movement of the first seat $30_1$, the second seat $30_2$, the third seat $30_3$, and/or the fourth seat $30_4$. The ECU 40 may be connected to a user interface 60 (e.g., an electronic user interface) that may facilitate receiving input from a user. For example and without limitation, the user interface 60 may be buttons, switches, a joystick, a microphone for voice commands, a speaker, a display, and/or a touch screen that may be connected to the ECU 40 and/or one or more seats 30. Additionally and alternatively, the user interface 60 may be configured to read gestures (e.g., sign language, intuitive gestures, etc.)

directed towards the camera 52 and/or a sensing pad on the seat 30, such as generally described in commonly-owned U.S. Pat. No. 9,383,872, which is hereby incorporated by reference in its entirety. Portions of a user interface 60 may be disposed in a central location (e.g., on a vehicle dashboard) and/or portions of a user interface 60 may be disposed on or in a seat 30. An occupant 56 may input a desired movement and/or position of a seat 30 via the user interface 60. The user interface 60 may include preset positions that an occupant 56 may select from and/or the occupant 56 may interact the user interface 60 until the desired position is reached.

With embodiments, the ECU 40 may receive information from one or more sensor assemblies 44 (step 104) to determine a proposed movement path of a seat 30 (e.g., the first seat $30_1$) according to an occupant input, such as from an occupant 56 seated in the first seat $30_1$ (step 106). The proposed movement path may be the most efficient and/or direct path from the current position to the desired position. The ECU 40 may determine the first/current positions of the second seat $30_2$, the third seat $30_3$, the fourth seat $30_4$, and/or one or more objects 48 (step 108). The ECU 40 may determine whether the second seat $30_2$, the third seat $30_3$, the fourth seat $30_4$, and/or an object 48 intersects with the proposed movement path (step 110). If the ECU 40 determines that the first seat $30_1$ will be able to freely move along the proposed movement path (e.g., without contact), then the ECU 40 may determine the proposed movement path to be the final movement path and move the first seat $30_1$ from the first position along the final movement path (step 116).

If the movement path is not clear, the ECU 40 may (i) determine a new/second movement path (e.g., iteratively) (step 112); (ii) move the other seats ($30_2$, $30_3$, $30_4$) out of the way of the desired movement path (step 114), and/or (iii) determine a new/second movement path and move at least one of the other seats ($30_2$, $30_3$, $30_4$) to a second position (steps 112 and 114). If the second seat $30_2$, the third seat $30_3$, the fourth seat $30_4$, and/or an object 48 intersect with the proposed movement path, the ECU 40 may determine a second movement path that does not contact the second seat $30_2$, the third seat $30_3$, the fourth seat $30_4$, and/or an object 48. The ECU 40 may move the first seat $30_1$ along the first movement path up to the point of contact or until a predetermined gap is reached (e.g., without actually making contact), and/or may move the first seat $30_1$ along the second movement path. If the desired movement or position cannot be reached, such as if the second seat $30_2$, the third seat $30_3$, the fourth seat $30_4$, and/or an object 48 cannot be moved out of a movement path, the ECU 40 may notify the occupant 56 with a visual and/or audible warning, such as via the user interface 60. In embodiments, the occupant 56 may manually override and/or stop movement of the seat 30 via a user interface 60, such as with a stop button, switch, voice command, etc.

Additionally or alternatively, the ECU 40 may determine whether the second seat $30_2$, the third seat $30_3$, the fourth seat $30_4$, and/or the object 48 may be moved to a second position that does not intersect with the proposed movement path. If such movement is possible, the ECU 40 may move the second seat $30_2$, the third seat $30_3$, the fourth seat $30_4$, and/or the object 48 to a second position. After the second seat $30_2$, the third seat $30_3$, the fourth seat $30_4$, and/or the object 48 is in the second position and no longer intersects the proposed movement path, the ECU 40 may move the first seat $30_1$ along the proposed movement path. In embodiments, the ECU 40 may move multiple seats 30 and/or one or more objects 48 simultaneously. For example and without limitation, the ECU 40 may move the first seat $30_1$ along the proposed movement path at the same time as moving the second seat $30_2$, the third seat $30_3$, the fourth seat $30_4$, and/or the object 48 out of intersection with the proposed movement path (e.g., to a second position).

With embodiments, the ECU 40 may determine a new movement path and the ECU 40 may determine a second position for at least one of the second seat $30_2$, the third seat $30_3$, the fourth seat $30_4$, and/or an object 48 such that the second position of the second seat $30_2$, the third seat $30_3$, the fourth seat $30_4$, and/or the object(s) 48 does not intersect with the new/second movement path. For example and without limitation, the ECU 40 may determine a movement scheme for moving a first seat $30_1$ to a second position that may include moving the first seat $30_1$ along a second movement path and moving at least one of the second seat $30_2$, the third seat $30_3$, the fourth seat $30_4$, and/or an object 48 to a second position.

In embodiments, such as generally illustrated in FIGS. 4A-8, an ECU 40 may receive an input from an occupant 56 via the user interface 60 to move to a desired position and/or in a desired movement direction (which may effectively be a series of inputs of desired positions). For example and without limitation, an occupant 56 may desire to move longitudinally (see, e.g., FIG. 4A) and/or move rotationally (see, e.g., FIGS. 5A and 6A). The ECU 40 may determine a proposed movement path based on the input from the user interface 60. The proposed movement path may include longitudinal movement towards a rear 62 of the vehicle 36 (see, e.g., FIG. 4A), and/or the proposed movement path include rotational movement, such as in a clockwise direction (see, e.g., FIGS. 5A and 6A). The proposed movement path may include lateral/transverse movement of a seat 30 (see, e.g., FIG. 6A), rotation of the seat 30, and/or longitudinal movement of the seat 30, some or all of which may occur simultaneously. A combination of lateral/transverse and/or longitudinal movement with rotational movement may result in a generally oblong movement path of the seat 30.

Figure 4A:
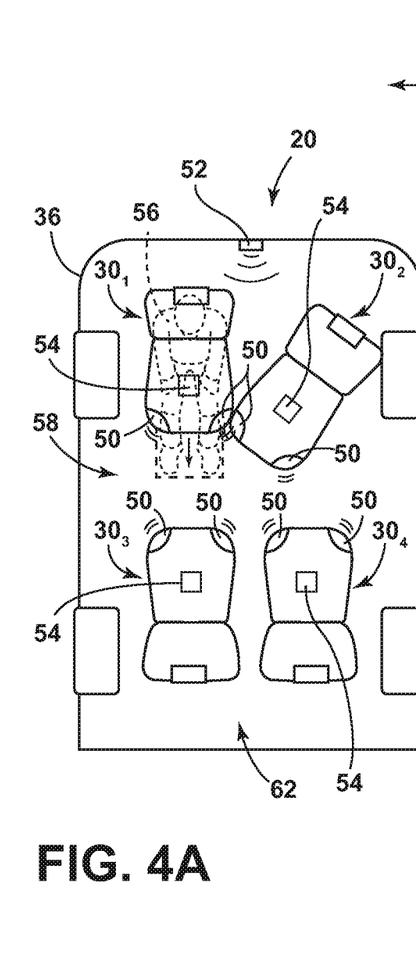
FIGS. 4A, 4B, and 4C are top views generally illustrating embodiments of seat assemblies according to teachings of the present disclosure.
Figure 4B:
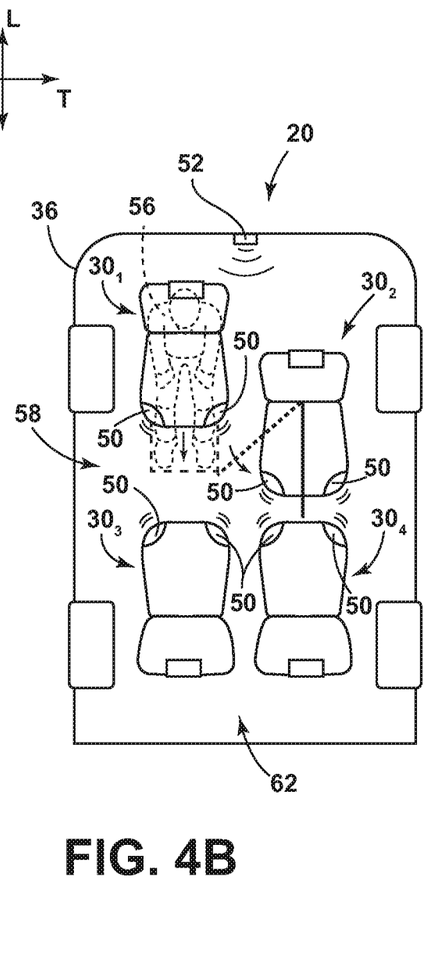
Figure 4C:
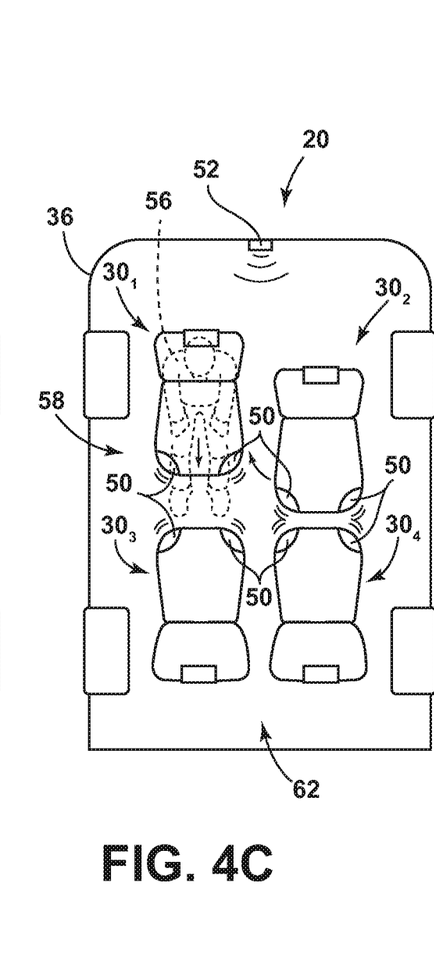
Figure 5A:
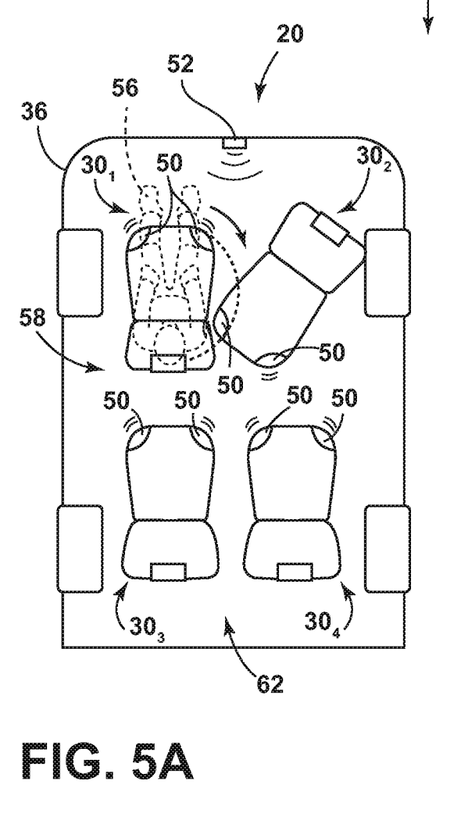
FIGS. 5A, 5B, and 5C are top views generally illustrating embodiments of seat assemblies according to teachings of the present disclosure.
Figure 5B:
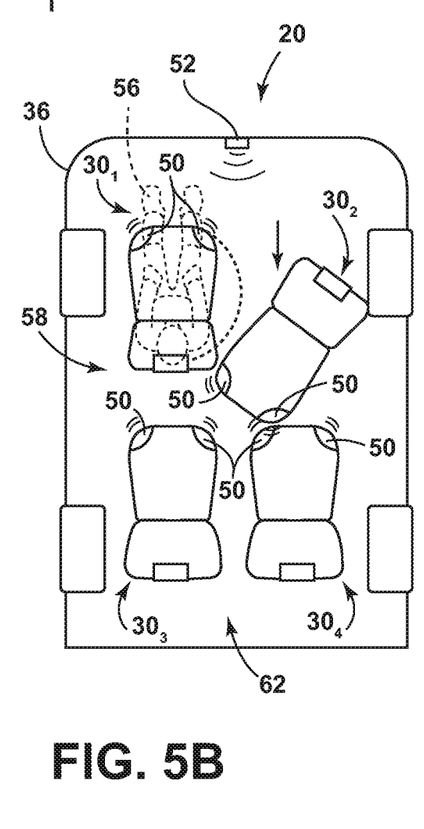
Figure 5C:
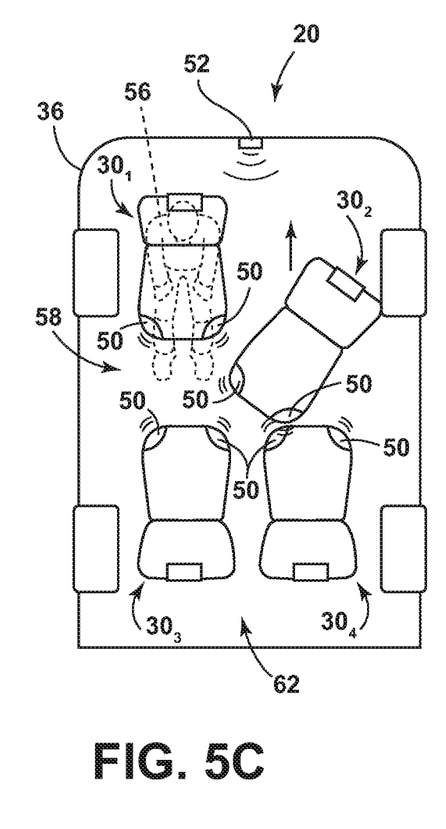
Figure 6A:
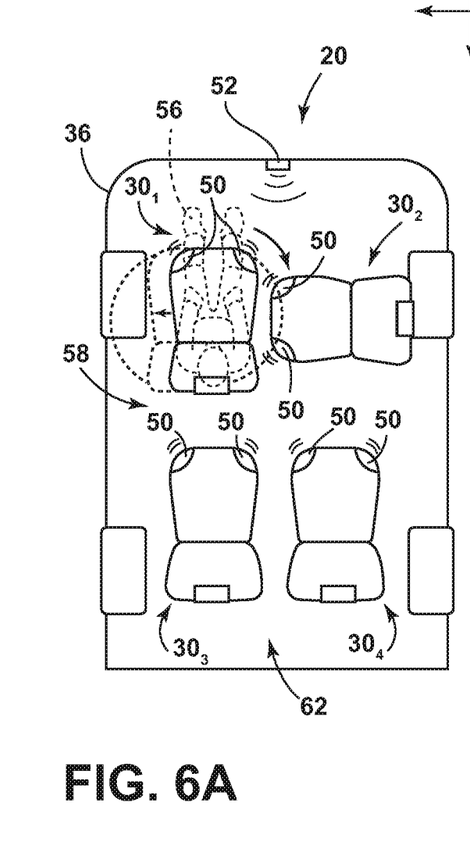
FIGS. 6A, 6B, and 6C are top views generally illustrating embodiments of seat assemblies according to teachings of the present disclosure.
Figure 6B:
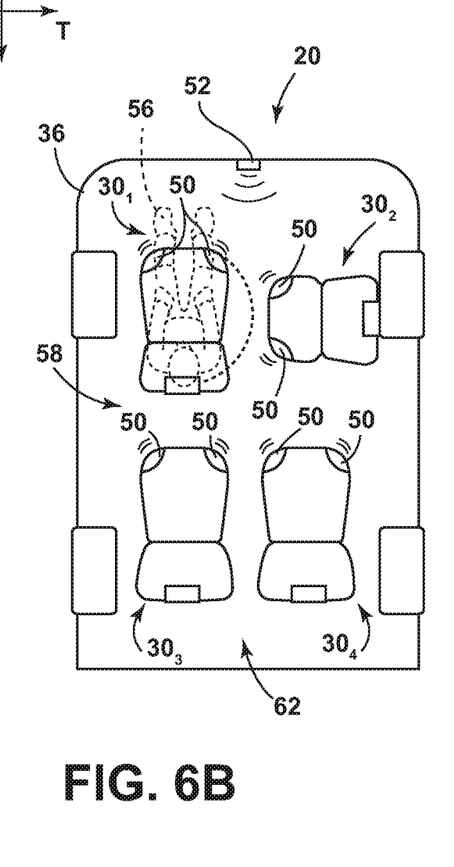
Figure 6C:
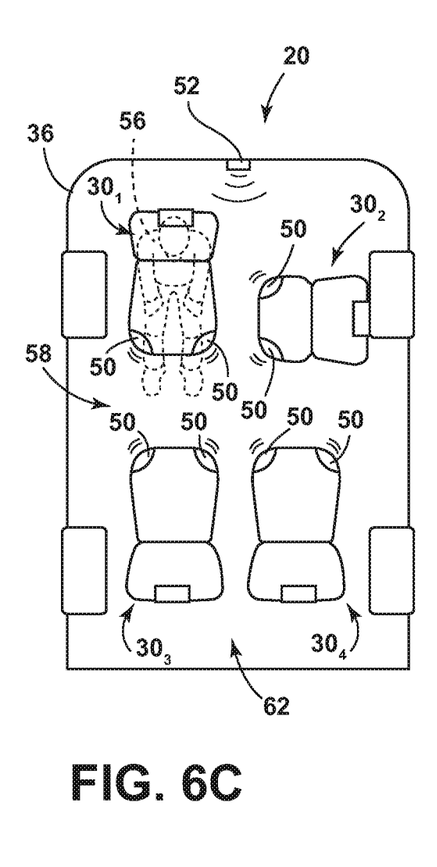

With embodiments, the ECU 40 may determine the current position (e.g., the first position) of the second seat $30_2$, the third seat $30_3$, the fourth seat $30_4$, and/or the object 48 via the one or more sensor assemblies 44. The ECU 40 may determine whether the second seat $30_2$, the third seat $30_3$, the fourth seat $30_4$, and/or an object 48 intersects with the proposed movement path of the first seat $30_1$. In embodiments, if the second seat $30_2$ intersects with the proposed movement path of the first seat $30_1$, and/or the ECU 40 may determine whether the second seat $30_2$ may be moved to a second position out of the proposed movement path of the first seat $30_1$. For example and without limitation, the ECU 40 may rotate (see, e.g., FIG. 4B) and/or move longitudinally (see, e.g., FIG. 5B) the second seat $30_2$ to a second position. Additionally or alternatively, moving the second seat $30_2$ to a second position may include tilting the seat back 34 and/or the seat base 32 (see, e.g., FIG. 6B) such that the second seat $30_2$ does not intersect the proposed movement path of the first seat $30_1$. The ECU 40 may move the first seat $30_1$ along the proposed movement path (see, e.g., FIGS. 4C, 5C, and 6C) once the second seat $30_2$ is in the second position (e.g., a position that does not intersect with the proposed movement path).

In embodiments, the ECU 40 may determine whether the second seat $30_2$ may return to the first position after the first seat $30_1$ is in the second position. The ECU 40 may store the location of the first position of the second seat $30_2$, and/or the ECU 40 may determine a return path for the second seat $30_2$ to move from the second position back to the first position. If the return path does not intersect with the first seat $30_1$, the third seat $30_3$, the fourth seat $30_4$, and/or the object 48, the ECU 40 may move the second seat $30_2$ back to the first position (see, e.g., FIGS. 4C, 5C, and 6C). If the return path intersects with the first seat $30_1$, the third seat $30_3$, the fourth seat $30_4$, and/or the object 48, the ECU 40 may move the second seat $30_2$ as close as possible, without contact, to the first position.

Figure 8A:
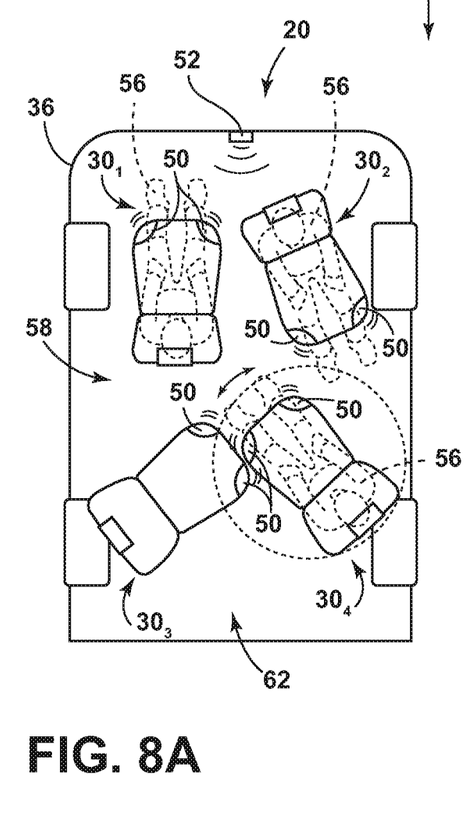
FIGS. 8A, 8B and 8C are top views generally illustrating embodiments of seat assemblies according to teachings of the present disclosure.
Figure 8B:
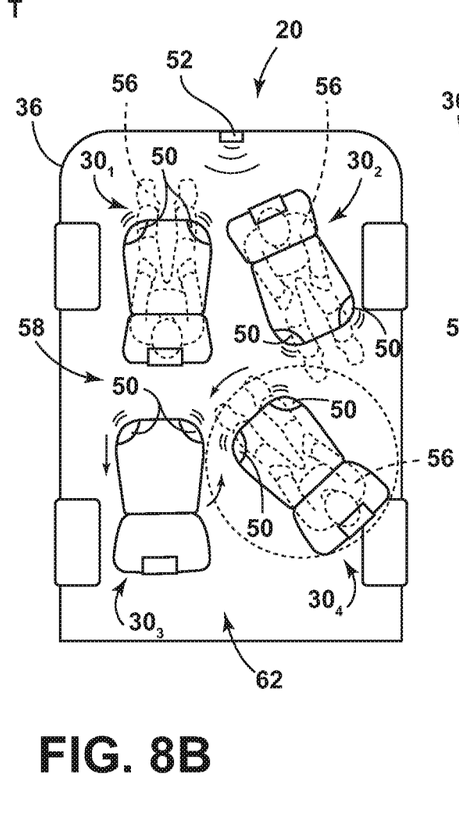
Figure 8C:
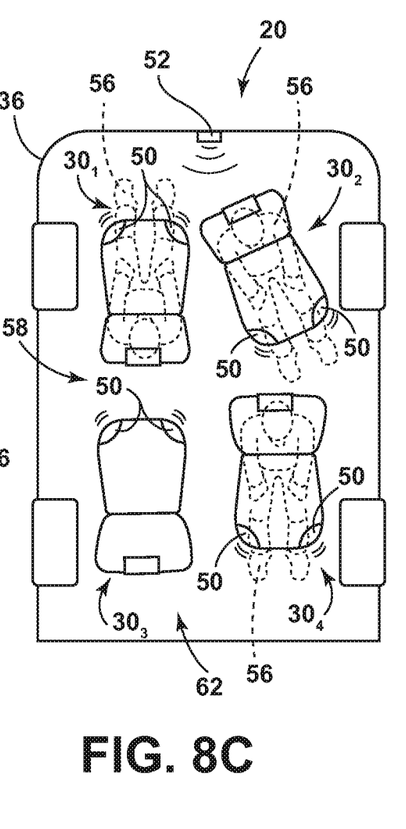

In embodiments, the ECU 40 may prioritize movement of unoccupied seats over occupied seats when more than one seat 30 intersects the desired movement path of a particular seat 30. For example and without limitation, the ECU 40 may receive an input from an occupant 56 in the fourth seat $30_4$ via the user interface 60 to move to a desired position and/or in a desired movement direction. The ECU 40 may determine a proposed movement path of the fourth seat $30_4$. The ECU 40 may determine, via the one or more sensor assemblies 44 (e.g., the one or more occupancy sensors 54), that the first seat $30_1$ and the second seat $30_2$ may be occupied, and the third seat $30_3$ may not be occupied. The ECU 40 may determine the current positions of the first seat $30_1$, the second seat $30_2$, and/or the third seat $30_3$, and the ECU 40 may determine that the proposed movement path of the fourth seat $30_4$ intersects with the second seat $30_2$ and the third seat $30_3$. With embodiments, the ECU 40 may determine that the fourth seat $30_4$ may be moved to the desired position if either of the second seat $30_2$ or the third seat $30_3$ are moved to a second position (see, e.g., FIG. 8A). The ECU 40 may move the third seat $30_3$ (the unoccupied seat) instead of moving the second seat $30_2$ (the occupied seat). For example and without limitation, the ECU 40 may move the third seat $30_3$ rotationally in a counterclockwise direction and/or longitudinally towards a rear of the vehicle 36 to a second position such as to permit the fourth seat $30_4$ to move rotationally and/or longitudinally to the desired position (see, e.g., FIG. 8B). Once the third seat $30_3$ is in the second position, the ECU 40 may move the fourth seat $30_4$ to the desired position (see, e.g., FIG. 8C).

Figure 7A:
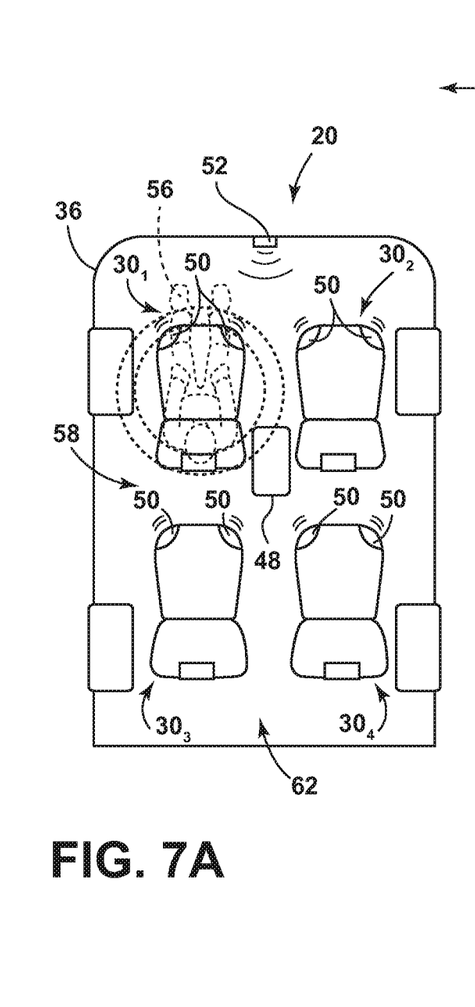
FIGS. 7A and 7B are top views generally illustrating embodiments of seat assemblies according to teachings of the present disclosure.

With embodiments, such as generally illustrated in FIGS. 1C, 1D and 7A, the ECU 40 may be configured to move the first seat $30_1$, the second seat $30_2$, the third seat $30_3$, and/or the fourth seat $30_4$ vertically. For example and without limitation, the ECU 40 may move a seat 30 from a first vertical position (FIG. 1C) to a second vertical position (FIG. 1D). The ECU 40 may receive a desired movement path and/or desired position from the user interface 60 of the first seat $30_1$. The second seat $30_2$, the third seat $30_3$, the fourth seat $30_4$, and/or the object 48 may intersect with the desired movement path of the first seat $30_1$. In embodiments, the object 48 may be a console of a vehicle 36. The ECU 40 may vertically move the first seat $30_1$ such that the object 48 may not intersect the desired movement path of the first seat $30_1$ (see, e.g., FIG. 7A, with different heights of the first seat $30_1$ generally illustrated as dashed rings). In embodiments, vertical movement of the first seat $30_1$ may include (i) raising the first seat $30_1$, (ii) rotating and/or longitudinally moving the first seat $30_1$, and/or (iii) lowering the first seat $30_1$ back to the original height.

Figure 7B:
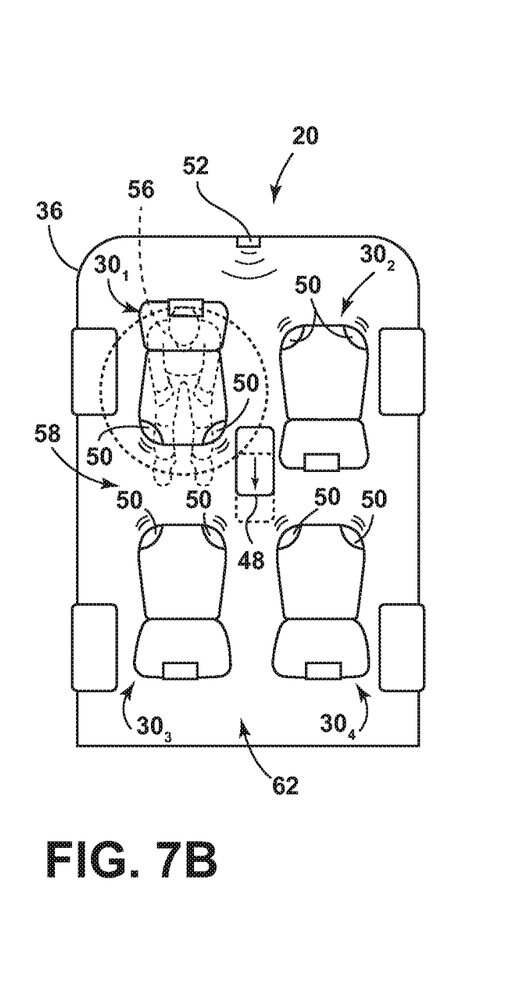

Additionally or alternatively, the ECU 40 may automatically move the object 48 (e.g., a console). The ECU 40 may be connected to the object 48 such that the ECU 40 may move the object 48 in a longitudinal direction. The ECU 40 may determine that the object 48 may intersect with the desired movement path (see, e.g., FIG. 7B) and may move the object 48 to a second position. For example and without limitation, the ECU 40 may move the object 48 in a longitudinal direction towards a rear 62 of the vehicle 36 out of the desired movement path of the first seat $30_1$.

It should be understood that while embodiments of seat assemblies 20 are generally illustrated with four seats 30, seat assemblies 20 may include any number of seats 30 and/or objects 48 disposed in a wide variety of configurations.

With embodiments, the ECU 40 may be configured to store requested movements and/or determined movement paths. The ECU 40 may be configured to recognize if a requested movement is the same or similar to a previously requested movement and may utilize a corresponding previously determined movement path to determine a movement path (e.g., via machine learning).

In embodiments, an ECU 40 may include an electronic controller and/or include an electronic processor, such as a programmable microprocessor and/or microcontroller. In embodiments, an ECU 40 may include, for example, an application specific integrated circuit (ASIC). An ECU 40 may include a central processing unit (CPU), a memory (e.g., a non-transitory computer-readable storage medium), and/or an input/output (I/O) interface. An ECU 40 may be configured to perform various functions, including those described in greater detail herein, with appropriate programming instructions and/or code embodied in software, hardware, and/or other medium. In embodiments, an ECU 40 may include a plurality of controllers. In embodiments, ECU 40 may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

It should be understood that an electronic control unit (ECU) 40, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having both ROM, RAM, a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute one or more processors, multiple processors that are integrated into a single system or are distributed over and connected together through a communications network, and/or where the network may be wired or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A seat assembly, comprising:
    a plurality of seats, including:
        a first seat;
        a second seat;
    one or more sensor assemblies; and
    an electronic control unit connected to the one or more sensors assemblies;
    wherein the one or more sensor assemblies are configured to provide information about a first position of the first seat to the electronic control unit;
    the electronic control unit is configured to receive a requested second position of the first seat;
    the electronic control unit is configured to automatically move the first seat to the second position;
    the one or more sensor assemblies includes one or more occupancy sensors;
    the electronic control unit is configured to determine whether the plurality of seats are occupied via the one or more occupancy sensors;
    the electronic control unit is configured to determine movement paths of the plurality of seats according to user input; and,
    when determining the movement paths, the electronic control unit is configured to prioritize movement of unoccupied seats over movement of occupied seats.

2. The seat assembly of claim 1, wherein the electronic control unit is configured to analyze information from the one or more sensor assemblies to determine an initial position of the second seat.

3. The seat assembly of claim 1, wherein the one or more sensor assemblies include a first proximity sensor of the first seat and a second proximity sensor of the second seat.

4. The seat assembly of claim 1, wherein the electronic control unit is configured to automatically move the second seat to a secondary position to avoid contact with the first seat as the first seat moves from the first position to the second position.

5. The seat assembly of claim 1, including a console; wherein the electronic control unit is configured to move the console to facilitate movement of the first seat from the first position to the second position.

6. The seat assembly of claim 1, wherein the electronic control unit is configured to provide a warning to an occupant if the requested second position cannot be reached.

7. The seat assembly of claim 1, wherein the one or more sensor assemblies includes a camera and a proximity sensor; and the electronic control unit is configured to create a three-dimensional map of the seat assembly based on information from the one or more sensor assemblies.

8. A seat assembly, comprising:
    a first seat;
    a second seat;
    one or more sensor assemblies; and
    an electronic control unit connected to the one or more sensors assemblies;
    wherein the one or more sensor assemblies are configured to provide information about a first position of the first seat to the electronic control unit;
    wherein the electronic control unit is configured to:
        receive a requested second position of the first seat;

determine a proposed movement path of the first seat from the first position to the second position according to information from the one or more sensor assemblies;

determine if the second seat can be moved to a secondary position such that the first seat can be moved along the proposed movement path without contacting the second seat;

determine a final movement path of the first seat from the first position to the second position according, at least in part, to whether the second seat can be moved to the second position; and wherein if the electronic control unit determines that the second seat can be moved to the secondary position, the electronic control unit is configured to automatically move the second seat to the secondary position;

wherein the electronic control unit is configured to determine if the second seat can be returned from the secondary position to an initial position without contacting the first seat in the second position or other seats or components; and if the electronic control unit determines that the second seat can be returned to the initial position, the electronic control unit is configured to automatically return the second seat to the initial position.

9. The seat assembly of claim 8, including a plurality of seats; wherein the plurality of seats includes the first seat and the second seat; the one or more sensor assemblies includes one or more occupancy sensors; the electronic control unit is configured to determine whether the plurality of seats are occupied via the one or more occupancy sensors; and, when determining the final movement path, the electronic control unit is configured to prioritize movement of unoccupied seats over movement of occupied seats.

10. The seat assembly of claim 8, wherein if the electronic control unit determines that the second seat cannot be moved to the secondary position, the proposed movement path and the final movement path are different.

11. A seat assembly, comprising:
a first seat;
a second seat;
one or more sensor assemblies; and
an electronic control unit connected to the one or more sensors assemblies;

wherein the one or more sensor assemblies are configured to provide information about a first position of the first seat to the electronic control unit;

wherein the electronic control unit is configured to:
receive a requested second position of the first seat;
determine a proposed movement path of the first seat from the first position to the second position according to information from the one or more sensor assemblies;
determine if the second seat can be moved to a secondary position such that the first seat can be moved along the proposed movement path to the second position without contacting the second seat;
determine a final movement path of the first seat from the first position to the second position according, at least in part, to whether the second seat can be moved to the secondary position; and
move the first seat to the second position via the final movement path;

wherein if the electronic control unit determines that the second seat can be moved to the secondary position, (a) the electronic control unit is configured to automatically move the second seat to the secondary position, and (b) the proposed movement path and the final movement path are the same; and wherein if the electronic control unit determines that the second seat cannot be moved to the secondary position, the proposed movement path and the final movement path are different.

12. The seat assembly of claim 11, wherein the final movement path does not cross the secondary position of the second seat such that the first seat does not contact the second seat when the first seat moves from the first position to the second position.

13. The seat assembly of claim 11, wherein automatically moving the second seat to the secondary position includes rotating the second seat such that the second seat does not cross the proposed movement path.

* * * * *